Jan. 1, 1935.  A. C. CLAYTON  1,986,045
CHANGE SPEED GEARING
Filed Jan. 20, 1934  6 Sheets-Sheet 1

INVENTOR
A. C. Clayton
BY
ATTORNEY

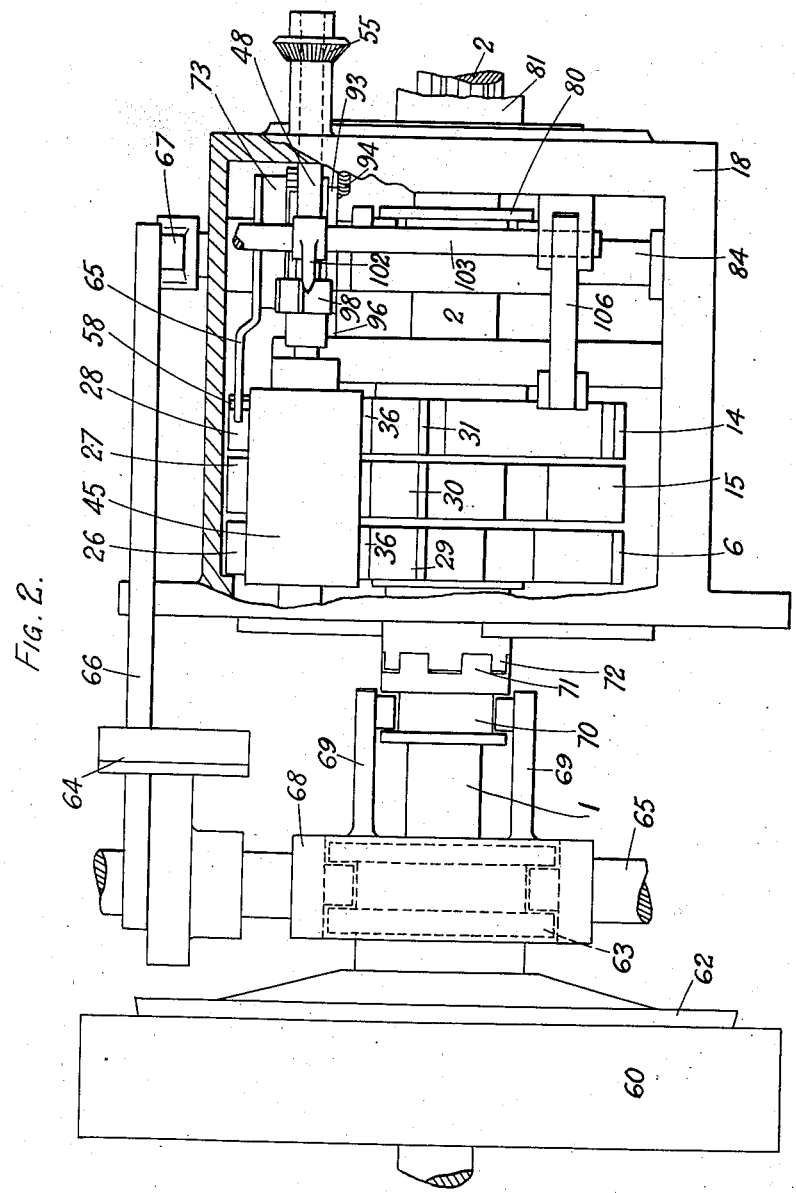

Jan. 1, 1935. A. C. CLAYTON 1,986,045
CHANGE SPEED GEARING
Filed Jan. 20, 1934 6 Sheets-Sheet 3

INVENTOR
A. C. Clayton
BY
ATTORNEY

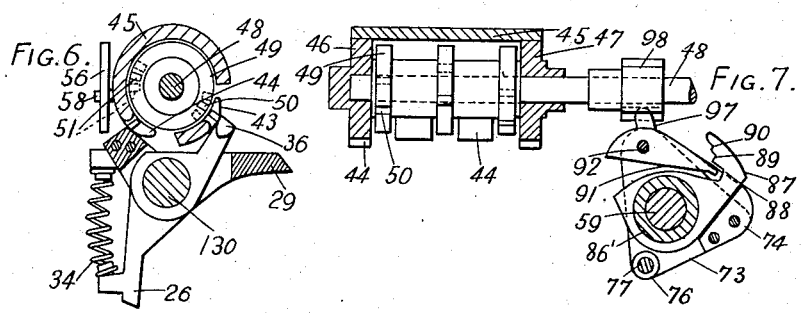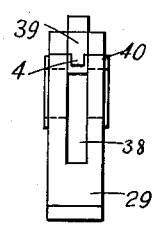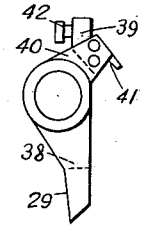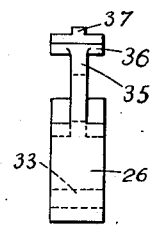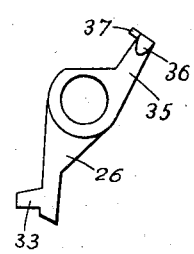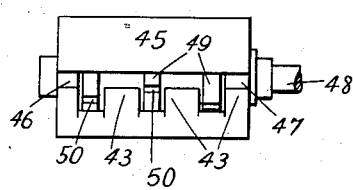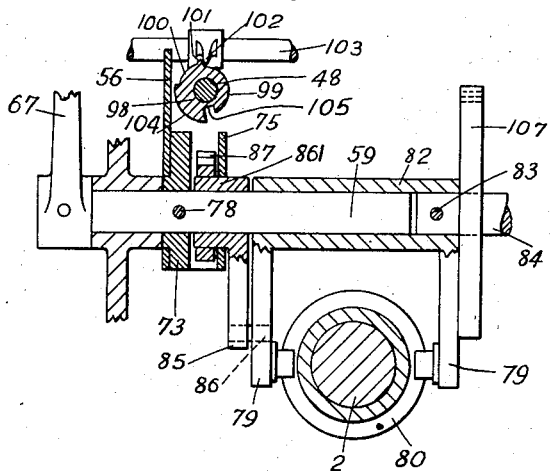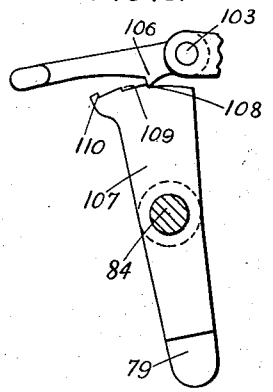

Jan. 1, 1935.  A. C. CLAYTON  1,986,045
CHANGE SPEED GEARING
Filed Jan. 20, 1934   6 Sheets-Sheet 5
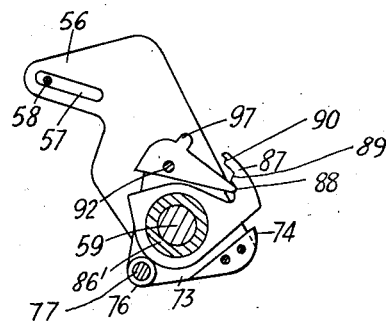
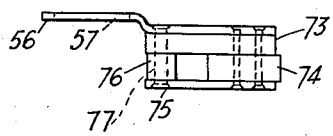
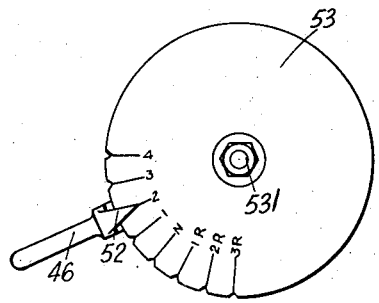
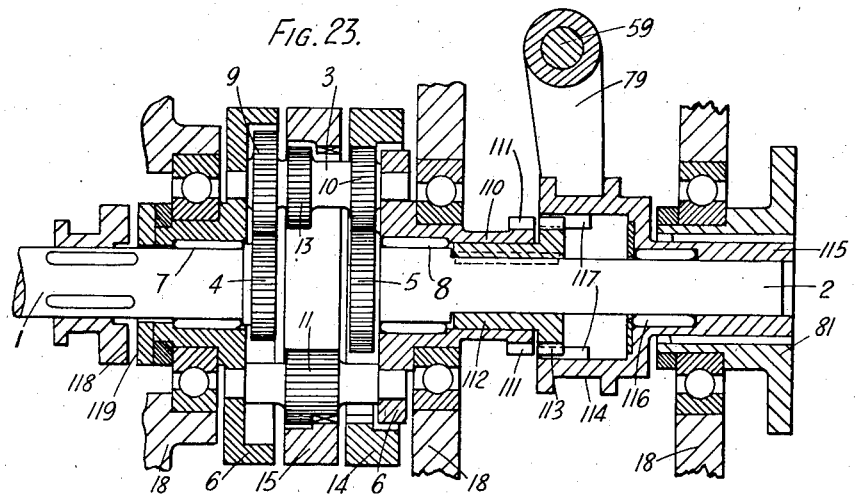
INVENTOR
A. C. Clayton
BY
ATTORNEY

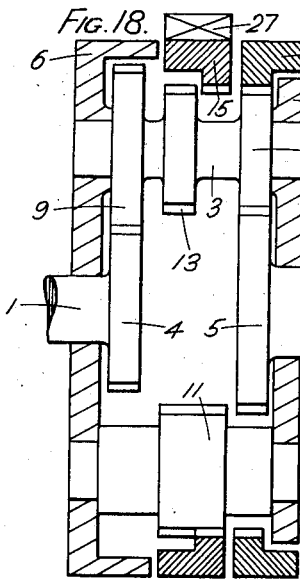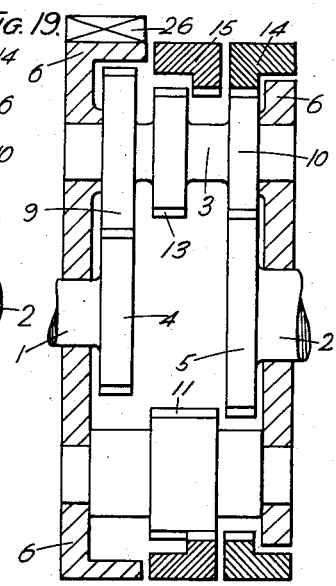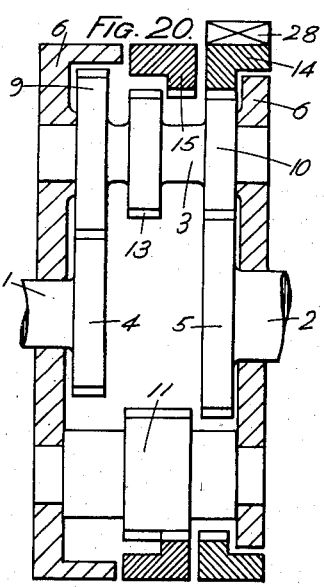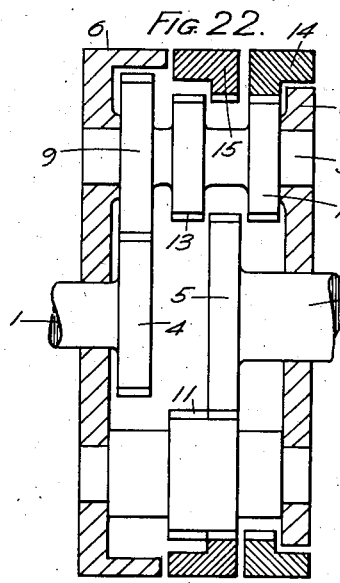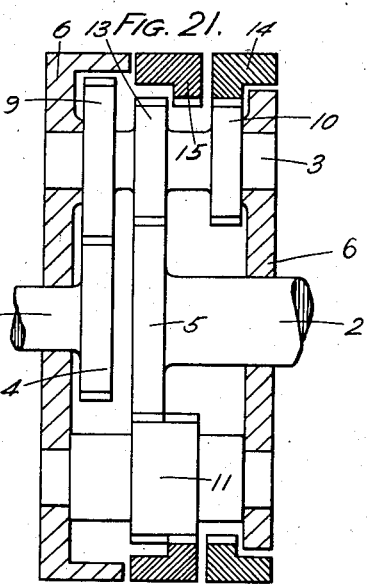

Patented Jan. 1, 1935

1,986,045

UNITED STATES PATENT OFFICE 1,986,045

CHANGE SPEED GEARING

Alec Charles Clayton, Willesden, London, England

Application January 20, 1934, Serial No. 707,565
In Great Britain May 3, 1933

13 Claims. (Cl. 74—274)

The invention relates to change speed gearing for use on motor propelled vehicles and for other purposes.

A change speed gear according to the invention comprises an input sunwheel, an output sunwheel and a layshaft in geared connection with said sunwheels, a rotary carrier in which said layshaft is journalled, one or more toothed wheels, preferably annular wheels, in geared connection with said layshaft, and means for selectively arresting and freeing said rotary carrier and said toothed wheel or wheels, for the purpose of effecting speed changes between said sunwheels. The sunwheels may be formed integrally with input and output shafts respectively, or be keyed, splined or otherwise fixed thereto.

The carrier may be provided with a plurality of similar layshafts which may be equally spaced around the sunwheels for the purpose of balancing the carrier when it is rotating and such a form is hereinafter described.

The carrier may be provided with one or more idle intermediate pinions, each meshing with a pinion on the layshaft and with an annular wheel, and the output sunwheel may be movable axially so that it may be disengaged from its corresponding pinion on the layshaft and be brought into engagement with an idle pinion to effect the reversal of the output shaft relatively to the input shaft. If desired, changes in the speed ratios of the two shafts can be effected under these conditions by selectively arresting and freeing the carrier and annular wheel or wheels.

A direct drive from the input to the output shaft can be effected by freeing the carrier and the annular wheel or wheels and by moving the output sunwheel axially, so that it also engages with a pinion on the layshaft as well as with an idle pinion, whereby the three shafts and their engaging gears rotate en bloc.

In order to facilitate gear changing, a clutch is preferably provided between the input shaft and the rotary carrier, this clutch being engaged when the engine clutch is disengaged, to permit of the changes being effected, and is disengaged when the engine clutch is engaged and the input shaft is driven.

The rotary carrier and the annular or other toothed wheel or wheels are held against rotation, when required, by suitable means, for example, by pawls engaging with ratchet teeth on the peripheries of these rotary members.

A selecting device, controlled by the driver, may be provided to determine which, if any, of the rotary members is to be arrested, and whether the output sunwheel is to be moved axially, and this may be so connected to the actual pawl and sunwheel shifting mechanism that the latter can only be operated when the engine clutch is disengaged.

In the accompanying drawings:

Figure 2 is a plan corresponding to Figure 1, the cover plate of the gear box being removed, part of the box being in section, and parts of the selecting mechanism being omitted for the sake of clearness.

Figure 6 is a front sectional elevation showing one pair of arresting pawls for one rotary member and the adjacent controlling discs and cam.

Figure 7 is a side sectional elevation showing the controlling discs and cam for the arresting pawls and part of the mechanism for moving the output sunwheel axially.

Figure 8 is a side elevation of the controlling discs and cam for the arresting pawls.

Figure 9 is a front sectional elevation of the mechanism for moving the output sunwheel axially, Figure 10 being a side elevation of a detent device for this mechanism.

Figure 11 is a side sectional elevation of part of the mechanism for shifting the output sunwheel, Figure 12 being a plan view corresponding thereto, except that some details have been omitted.

Figures 13 and 14 are, respectively, a side and front elevation of one arresting pawl, Figures 15 and 16 being similar views of another arresting pawl.

Figure 17 is a plan of the driver's selecting lever and dial.

Figures 18, 19, 20, 21 and 22 are diagrammatic side sectional elevations, respectively showing the gear wheels in the positions they occupy for the following conditions of drive:—first forward, second forward, third forward, direct forward, and reverse, only the minimum number of wheels being indicated, others, which might be seen, being omitted for the sake of clearness.

Figure 1:
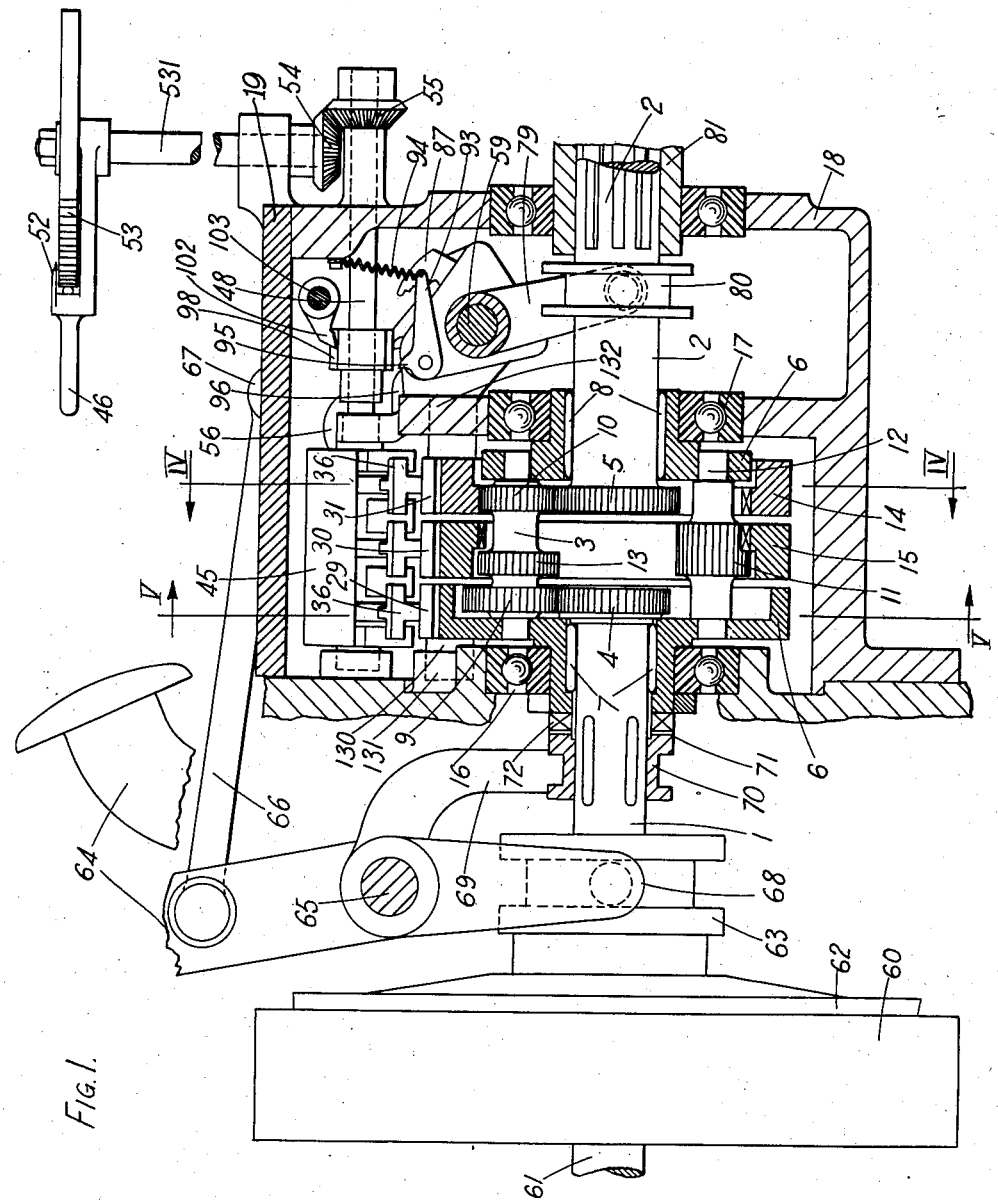
Figure 1 is a side sectional elevation of one form of change speed gear according to the invention, a conventional engine clutch and its operating mechanism being illustrated somewhat diagrammatically.

These diagrammatic figures may be considered as developed diagrams, the idle intermediate pinion indicated in each figure being displaced from its corresponding pinion on the lay shaft; or said idle pinion may be considered as one of a plurality of idle intermediate pinions in a form of change speed gear, as in the example illustrated in the preceding figures, wherein a plurality of layshafts and idle pinions are employed.

Figure 23 is a side sectional elevation of part of an alternative form of the change speed gear according to the invention, wherein the output sunwheel is not moved axially and with which only one speed in reverse is available.

In the form of change speed gear illustrated by Figures 1 to 22, 1 is an input shaft, 2 an output shaft and 3 a layshaft.

The input shaft has a sunwheel 4 and the output shaft has a sunwheel 5. The sunwheels 4 and 5 are either formed integrally with their shafts or keyed or otherwise fixed to them.

The layshaft 3 is mounted to rotate about its own axis in a carrier 6 which can rotate on roller bearings 7 and 8 on the input shaft 1 and output shaft 2, respectively. The lay shaft 3 has three pinions fixed on or formed integrally with it; two of these pinions 9 and 10 mesh, respectively, with the sunwheels 4 and 5. Assuming that the carrier 6 were held stationary, the input shaft 1 would be in geared connection with the output shaft 2 through the train of gears 4, 9, 10 and 5, as in an ordinary lay shaft drive.

In the example shown in Figures 1 to 22, the carrier 6 has three similar layshafts 3. It also has three intermediate or idle pinions 11, the spindles 12 of which are mounted to rotate freely in the carrier. Each intermediate idle pinion 11 meshes with a pinion 13 which is integral with or fixed on a lay shaft 3.

An annular wheel 14 meshes with the pinions 10 and another annular wheel 15 meshes with the intermediate idle pinions 11. The carrier 6 and the annular wheels 14 and 15 are adapted to be arrested and freed selectively, that is to say, any one may be selected to be arrested and the others to be freed, so as to effect changes in the speed ratio between the input and output shafts. In the example now under consideration, three speed changes can be effected by the selective arrest of any one of the rotary members 6, 14 and 15.

A direct forward drive is effected by shifting the sunwheel 5 into mesh with the intermediate idle pinions 11 and with the pinions 13 and freeing all of the rotary members 6, 14 and 15, so that the gear rotates en bloc.

A reverse drive is effected by moving the sunwheel 5 axially into mesh with the intermediate idle pinions 11 only, and by selectively arresting any one of the rotary members 6, 14 and 15 according to the speed required.

These various changes which are indicated by the diagrammatic Figures 18, 19, 20, 21 and 22, are only referred to here briefly, in order that the following description of the means illustrated for selectively arresting and freeing the rotary members 6, 14 and 15 and for moving the sunwheel 5 axially can be more easily appreciated. They will be referred to later with reference more particularly to the diagrammatic Figures 18 to 22.

The carrier 6 is shown mounted freely in ball bearings 16, 17, in a fixed casing 18 which has a removable cover 19.

Figure 3:
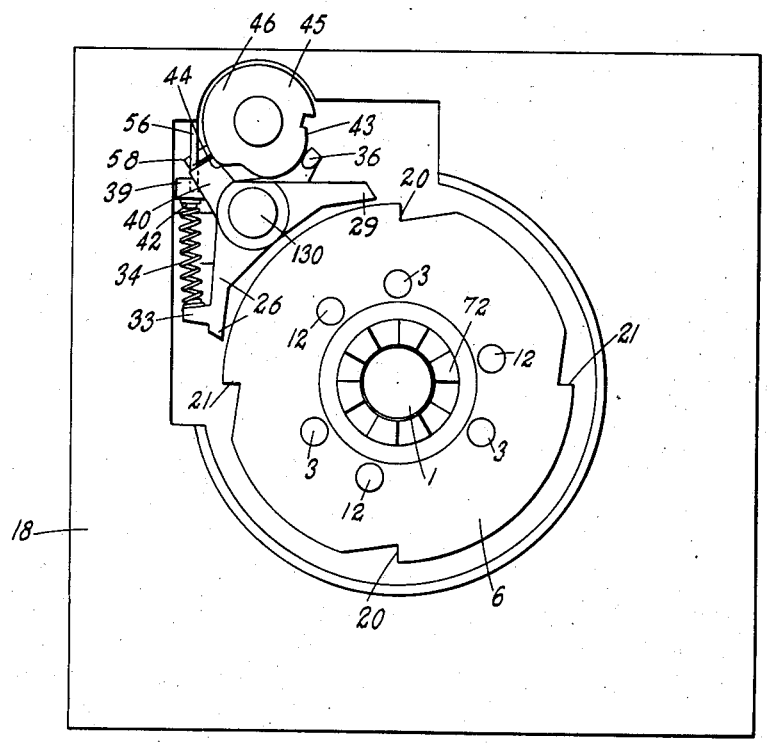
Figure 3 is a front elevation of the gear box.

The carrier 6 and the annular wheels 14 and 15 conveniently have peripheries of equal diameter, each periphery being formed with two sets of ratchet teeth of opposite hand, that is, the carrier 6 has two ratchet teeth 20, 20, Figure 3, for use on arresting the carrier 6 against a clockwise rotation (as viewed in Figures 3 and 5) and two ratchet teeth 21, 21 for use against an anti-clockwise rotation, assuming that the direction of rotation of the engine shaft is clockwise.

Figure 4:
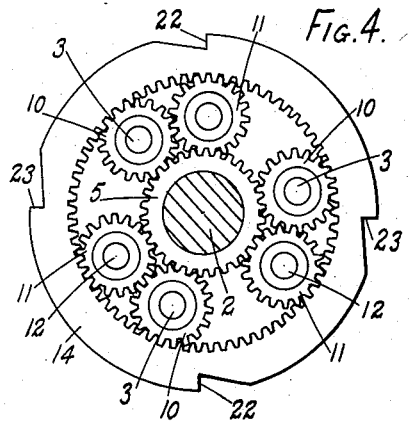
Figures 4 and 5 are, respectively, sectional views on the lines IV—IV and V—V, Figure 1, showing only some of the gear wheels, other gear wheels, which might be partly seen in such a view, being omitted for the sake of clearness.
Figure 5:
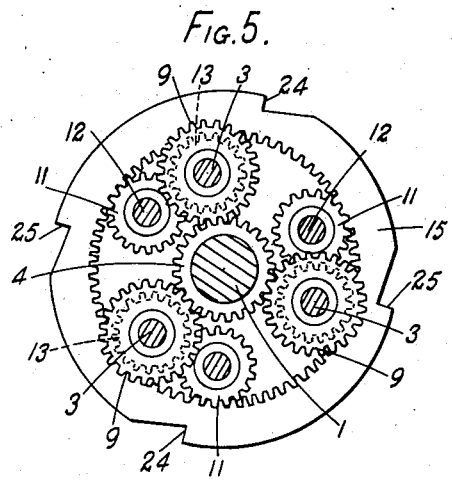

For similar purposes, the annular wheel 14 has two sets of ratchet teeth 22, 22 and 23, 23, Figure 4, and the annular wheel 15 has two sets of ratchet teeth 24, 24 and 25, 25, Figure 5.

Three pawls 26, 27 and 28, hereinafter termed "forward pawls", are provided for respectively engaging with teeth 20, 22 and 24, and three pawls 29, 30 and 31, hereinafter termed "reverse pawls", for respectively engaging with teeth 21, 23 and 25.

These pawls are freely mounted in pairs on a shaft 30, which is supported in bearings 31 and 32 on the fixed casing 18.

The pairs of pawls for the rotary members 6, 14 and 15 are all of similar construction, so that the description of one pair with particular reference to Figures 13 to 16 will suffice for them all. These figures show the pair of pawls 26 and 29 for controlling the carrier 6. The forward pawl 26 has a lug 33 for one end of a spring 34, Figures 3 and 6, and an extension 35, which has a cross piece or head 36, which has a tooth 37.

The extension 35 is narrower than the pawl 26 and is inserted in a slot 38 in the reverse pawl 29; and, in an extension 40 of the latter pawl, a block 39 is inserted in the slot 38 and riveted to the extension 40. The block has a tooth 41. It also has a set screw 42 for securing the adjacent end of the spring 34. The spring 34 tends to close the pair of pawls like a pair of pincers; that is, it yieldingly forces the pawls 26, 29 towards the periphery of the carrier 6. The pawls are lifted out of engagement with the ratchet teeth of the carrier 6 by cams 43 and 44, respectively engaging with the head 36 and extension 40. These cams are formed on a slotted sleeve 45 which is secured at its ends to discs 46 and 47, which are free to be oscillated on a shaft 48. In the positions of the sleeve 45 and pawls 26, 29, shown in Figure 6, the teeth 37, 41 are held just clear of the periphery of a disc 49, which is fixed to the shaft 48 and has two slots 50 and 51 for the reception, respectively, of the teeth 37 and 41, when the shaft 48 and, therefore, the disc 49 is oscillated appropriately to bring either slot 50 or 51 opposite to its corresponding tooth 37 or 41. When the sleeve 45 is subsequently returned to normal position, the corresponding pawl will be rocked by the spring 34 into a position to engage with the corresponding ratchet teeth on the rotary member or carrier 6 and so arrest said carrier against rotation. In the meantime, the tooth of the fellow pawl will have rested on the plain part of the periphery of the disc.

It is to be understood that there are two cams 43 and 44 and a slotted disc 49 for each pair of pawls and that the cams 43 and 44 and the slots 50 and 51 in the three discs 49 are in such relative positions that while all the pawls may be held simultaneously in a disengaged position relatively to the rotary members 6, 14 and 15, only one pawl at any time can be moved to an engaging position relatively to its corresponding rotary member, which is the rotary member selected for arrest, the others being free to rotate.

The discs 49 are selectively oscillated by the driver's lever 46, Figures 1 and 17, which has a pointer 52 moving over a dial 53, and is secured to a shaft 531, which has a bevel wheel 54 fixed to it and meshing with a bevel wheel 55 fixed on the shaft 48. The sleeve 45 is oscillated by an oscillatory plate 56, which has a cam slot 57, Figure 11, for the reception of a pin 58, Figure 6, on the sleeve 45. The plate 56 is riveted to a thicker triangular plate 73, a dog 74 and an apertured plate 75, as shown in Figures 7, 9 and 11. A distance piece 76 over one rivet 77, as well as the stop 74, holds the two plates 73 and 75 in spaced relation. The thicker plate 73 is fixed by a pin 78 to a shaft 59, which is mounted in the fixed casing 18. This shaft is oscillated each time that the engine clutch is engaged and disengaged.

For this purpose, the engine clutch pedal 64 is connected by a link rod 66 to a lever 67, Figures 1, 2 and 9, which is fixed to the outer end of the shaft 59.

The engine clutch may be of any suitable type and, for convenience of illustration, is conventionally indicated, in Figures 1 and 2, as a cone clutch, 60 being the clutch member fixed on the engine shaft 61, and 62 being the axially movable clutch member having a collar 63 splined on the input shaft 1 and slidable thereon for disengagement of the clutch by a fork 68, which is fixed to a rock shaft 65. The fork is oscillated by the pedal 64, also fixed to the rock shaft 65, the member 62 being returned for engagement with the member 60 by a spring which is not shown, as this and other usual details of this type of clutch are well known in the art.

The clutch 64 also oscillates a fork 69 which is fixed to the rock shaft 65. The fork 69 embraces a collar 70, which is splined to the input shaft and has teeth or dogs 71 for sliding engagement with similar teeth 72 on the adjacent end of the carrier 6, this device thus forming a dog clutch which is disengaged when the engine clutch is engaged and is engaged when the engine clutch is disengaged, it being preferred, however, so to arrange these parts that a very slight disengagement of the engine clutch, just sufficient to permit of slip, will not engage the dog clutch teeth 71, 72, so that the driver may release the engine clutch slightly, if desired, at times when he does not wish to change gear. Should he wish to change gear, in depressing the pedal 64 to rock the shaft 59 sufficiently, he will engage the dog clutch teeth 71, 72. This will lock the carrier 6 to the input shaft 1. The number of the dog teeth 71 or 72 is a factor of the number of teeth of the toothed wheels 4, 5, 9, and 10, so that when the output sunwheel 5 is moved axially as hereinafter described, engagement of the same with the pinions 11 and 13 will be facilitated.

The output sunwheel 5 is moved axially by a fork 79 which embraces a collar 80 fixed on the output shaft 2, which is axially slidable in the roller bearings 8 and in the adjacent end of a sleeve 81, which is connected to the propeller shaft in the manner well known in the art, the outer end of the output shaft 2 being splined in the sleeve 81. The output sunwheel 5 thus moves axially with the output shaft 2. The fork 79 is not fixed to the shaft 59, but has a boss 82, Figure 9, which is free to oscillate on the shaft 59, but is fixed by a pin 83 to a stub shaft 84 journalled in the fixed casing 18. The fork 79 is oscillated by a crank 85 having a crank pin 86 entering a hole in the adjacent part of the fork 79. The crank 85 has a boss 861, Figures 7, 9 and 11, freely mounted on the shaft 59 and extending freely through the apertured plate 75, hereinbefore referred to.

A ratchet 87 is fixed to the boss 86.

It has three teeth or steps 88, 89 and 90, arranged at successively increasing radial distances from the centre line of the shaft 59. A pawl 91, Figures 7 and 11, is fixed to a pin 92 which is mounted to oscillate in the plates 73 and 75 and has a lever 93, Figure 1, fixed to it. The pawl 91 has a tooth 97 for co-operation with a cam 98, which is fixed on the shaft 48, which sets the slotted discs 49 hereinbefore referred to.

A spring 94 is attached at one end to the lever 93 (Figures 1 and 2), and at the other to the fixed casing 18. The lever 93 has a tooth 95 for co-operation with a projection 96 on the adjacent part of the fixed casing 18.

The cam 98, above referred to, has three cam surfaces 99, 100 and 101, Figure 9, for co-operation with a pawl 102, which is fixed to a shaft 103, which is journalled in the fixed casing 18. The cam surface 99 and other cam surfaces 104 and 105 on the cam 98 co-operate with the tooth 97 on the pawl 91.

One function of the cam 98 is to set the pawl 91 selectively to engage with one of the ratchet teeth or steps 88, 89 and 90 and, being fixed on the shaft 48, is oscillated by the driver's selecting handle 46 simultaneously with the setting of the slotted discs 49.

Another function of the cam 98 is to operate a detent for preventing or permitting rearward axial movement of the output shaft 2 without interfering with forward sliding movement of said shaft, when required. This detent is indicated in Figures 2 and 10 as a pawl 106 fixed to the shaft 103 and co-operating with a ratchet 107 (Figures 9 and 10), which is fixed to the fork 79.

The ratchet has three teeth 108, 109 and 110 corresponding to the three positions which are occupied by the output sunwheel 5 when set for forward driving with first, second and third gear, reverse driving and direct forward driving, respectively.

The operation of the detent pawl 106, namely, the raising and lowering of the detent pawl 106 to release and to engage with the ratchet teeth 108, 109 and 110, is effected by the cam surfaces 99, 100 and 101 of the cam 98.

*General operation*

Assuming that the vehicle on which the gear is fitted has been running in first, second or third forward speed and that the driver wishes to change into one of the other of these three forward speeds, he first depresses the engine clutch pedal 64 to disengage the engine clutch 60, 62, and engage the teeth 70, 71 of the dog clutch, thereby locking the input shaft 1 to the carried 6, and, through the medium of the link rod 66 and lever 67, to rock the shaft 59, so that the slotted cam plate 56 is rocked and through the pin 58 and cam slot 57 partly rotates the cam sleeve 45 which by its cams ensures that all the arresting pawls 26 to 31 are set to inoperative positions and that the carrier 6 and annular wheels 14 and 15 are free. As the output sunwheel 5 has been in mesh with the pinions 10 and, therefore, in its rearmost position (as indicated in Figure 1), the dog 74 will not engage with the ratchet 87 and no movement of the fork and thereby no axial movement of the output shaft 2 and output sun pinion 5 will occur The driver then moves the selecting lever 46 to the gear required, thereby, through the medium of the shafts 48 and 53, rotating the slotted discs 49 until the appropriate disc (for the rotary member 6, 14 or 15 which is to be arrested) is set with its slot 50 opposite to the tooth 37 of the arresting pawl required for the arrest of the required rotary member.

The driver then releases the pedal to allow the engine clutch to engage and the dog clutch teeth 70—71 to disengage. At the same time, the shaft 59 is again rocked and, through the slotted cam plate 56, again partly rotates the cam sleeve 45 to release the arresting pawls. Only the pawl whose tooth 37 can fall into the slot 50 of the selected disc 49 can, however, move into operative position to engage with the ratchet teeth 20, 22 or 24 on the appropriate rotary member 6, 14, or 15, which is thereby arrested. The teeth 37 and 41 of the other arresting pawls merely rest against the plain peripheries of the discs so that they are held in their inoperative positions.

In Figures 18, 19 and 20, the rotary members, which are arrested to effect, respectively, first, second and third speeds, are diagrammatically shown provided with a corresponding forward arresting pawl 27, 26 and 28.

Assuming that the driver wishes to change from one of these forward speeds to a direct forward drive, indicated by Figure 21, he again declutches the engine clutch, sets the selecting lever 46 to an appropriate position (4) on the dial 53 and again engages the engine clutch. In this case, all the arresting pawls are held inoperative and the three rotary members are free, but the selecting lever 46 having rotated the shaft 48 to a greater degree, the cam 98, Figures 9 and 10, is rotated sufficiently for the cam surface 101 to lift the pawl 102 and, therefore, to raise the detent pawl 106 to a level at which it is ready to engage with the step 110 of the ratchet 107. At the same time, the cam surface 105 of the cam 98 engages with the lug 97 on the pawl 91, so that this pawl is set for engagement with the step 90 of the ratchet 87.

When the driver lets the engine clutch again engage, the consequent rotation of the shaft 59 first carries the pawl 91 into engagement with the step 90 of the ratchet 87 and then thereby rocks the ratchet 87 to rock the fork 79 to its fullest extent to move the output shaft 2 axially sufficiently to bring the output sunwheel 5 into mesh with the intermediate idle pinions 11 and the pinions 13 on the layshafts 3 (Figure 21), whereupon all the gear wheels rotate en bloc.

Assuming that the driver when in first, second or third speeds had wished to change to reverse instead of to direct drive as above described, a similar action would have occurred, except that the movement of the selecting lever 46 would only result in the setting of the pawl 91 to engage with the step 89 of the ratchet 87, so that on the re-engagement of the engine clutch, the output sunwheel is moved axially only into engagement with the intermediate idle pinions 11 as indicated in Figure 22. It will be noticed that the dial 53 is provided with three reverse speed indications 1R, 2R, 3R.

Accordingly as the selecting lever 46 is moved to these indications, so will one of the reverse arresting pawls 30, 29 or 31 be selectively set by its appropriate slotted disc 49 for operation to arrest the corresponding rotary member 15, 6 or 14. By these means, three speeds in reverse are obtainable.

Whenever a change is effected from reverse or from direct forward drive, the output sunwheel 5 is returned, on the disengagement of the engine clutch, to its normal position in mesh with the pinions 10 by reason of the dog 74 engaging with and moving the ratchet 87.

Should it be desired to set the change speed gear to a neutral condition, the driver's selecting lever 46 is moved to the position marked N on the dial 53. In this position of the lever 46, the discs 49 are rotated to a position in which plain portions of their peripheries are opposite to all the teeth 37 and 41, so that none of the pawls 26 and 29 can engage with the respective rotary member 6, 14 or 15. As the output sunwheel 5 is maintained in its rearmost position in mesh with the pinions 10, and all the rotary members 6, 14 and 15 are free to rotate, no driving effort will be transmitted from the input shaft 1 to the output shaft 2.

In the example hereinbefore described, the speed ratios between the input and output shafts for the first, second and third speeds are respectively 4:1, 2:1, 4:3, the input sunwheel 4 and the pinions 9 each having 24 teeth, the pinions 10, 11 and 13 each having 18 teeth, and the output sunwheels having 30 teeth.

In constructing a change speed gear such as above described but with which only one speed in reverse is required, it is preferred to dispense with the necessity for moving the output sunwheel axially either for effecting a direct forward drive or reverse, and this is possible according to the modification illustrated by Figure 23.

In this figure, only those parts which are necessary to its understanding are shown, all the other parts required being similar to those adopted in the form of change speed gear hereinbefore described.

In the modification, means are provided for locking the rotary carrier for the layshafts to the output shaft for direct forward drive, and for locking the carrier to the propeller shaft and for disconnecting the output shaft from the propeller shaft for reverse drive, the carrier in these latter circumstances transmitting the drive to the propeller shaft.

In Figure 23, the parts which correspond to parts in the previously described construction are indicated by similar reference numerals to those adopted in the previous figures of the drawings.

In Figure 23, the carrier 6 has a sleeve 110, provided with dog clutch teeth 111. The sleeve 110 can rotate freely on another sleeve 112, which is keyed to the output shaft 2 and has a similar set of dog clutch teeth 113.

A collar 114 has a sleeve 115 which is free to rotate on roller bearings 116 on the output shaft 2, but is splined to the sleeve 81 which is connected to the propeller shaft in the usual manner. The collar 114 has a set of dog clutch teeth 117 which are long enough to engage with both sets of clutch teeth 111 and 113 simultaneously.

The collar 114 is adapted to slide axially and is operated by a fork 79, which is the equivalent of the fork 79 shown in the drawings illustrating the example first described and is similarly operated, except that instead of shifting the output sunwheel 5, it merely shifts the collar 114. The selecting dial 53, Figure 17, is appropriately graduated to ensure setting of the selecting lever 46 to such positions on the dial that the collar 114 is moved to bring its teeth 117 into engagement only with the set of teeth 111 or only with the set of teeth 113 or with both of these sets of teeth simultaneously. In this modified construction, the three rotary members 15, 6 and 14 are respectively arrested as in the previous example, to give first, second and third forward speeds, under which conditions, the collar 114 is in the position shown in Figure 23, that is, with its clutch teeth 117 in engagement with the clutch teeth 113 only, so that the drive is transmitted from the output shaft 2 through the sleeve 112 and the collar 114 to the sleeve 81.

When a direct drive is required, the three rotary members 6, 14 and 15 are freed, as in the previous example, and the collar 114 is moved axially to bring its teeth 117 into engagement with both sets of teeth 111 and 113, so that the output shaft 2 is locked to the carrier 6 and the whole gear rotates en bloc.

When a reverse drive is required, the collar 114 is moved axially sufficiently to bring the teeth 117 into engagement only with the teeth 111 on the sleeve 110 of the carrier 6. The annular wheel 15 is arrested by its appropriate reverse arresting pawl, so that when the input shaft is rotated by the engine clutch, the carrier 6 is rotated in a reverse direction to that of the input shaft 1, and the drive is transmitted from the carrier sleeve 110 and the collar 114 to the sleeve 81, which is connected to the propeller shaft.

In this modification, a friction clutch 118, 119, is substituted for the dog clutch teeth 71, 72 of the form of gear first hereinbefore described.

I claim:

1. A change speed gear comprising an input shaft, an output shaft and a layshaft, a sunwheel fixed on the input shaft, a sunwheel fixed on the output shaft and a plurality of pinions fixed on the layshaft, each of said sunwheels meshing with one of said pinions on the layshaft, a rotary carrier in which said layshaft is journalled, an intermediate idle wheel on said carrier meshing with one of said pinions on the layshaft, a plurality of rotary annular wheels, one meshing with said intermediate idle wheel and the others each meshing with one of the pinions on the layshaft, and means for selectively arresting and freeing said rotary annular wheels and rotary carrier for the purpose of effecting speed changes between the input and output shafts.

2. A change speed gear comprising an input shaft, an output shaft and a layshaft, a sunwheel fixed on the input shaft, a sunwheel fixed on the output shaft and a plurality of pinions fixed on the layshaft, each of said sunwheels meshing with one of said pinions on the layshaft, a rotary carrier in which said layshaft is journalled, an intermediate idle wheel on said carrier meshing with one of said pinions on the layshaft, a plurality of rotary annular wheels, one meshing with said intermediate idle wheel and the others each meshing with one of the pinions on the layshaft, and means for selectively arresting and freeing said rotary annular wheels and rotary carrier for the purpose of effecting speed changes between the input and output shafts, and means for moving the output sunwheel axially from engagement with a pinion on the layshaft into engagement with said intermediate idle pinion for the purpose of effecting a reversal in the rotation of the output shaft relatively to that of the input shaft.

3. A change speed gear comprising an input shaft, an output shaft and a layshaft, a sunwheel fixed on the input shaft, a sunwheel fixed on the output shaft and a plurality of pinions fixed on the layshaft, each of said sunwheels meshing with one of said pinions on the layshaft, a rotary carrier in which said layshaft is journalled, an intermediate idle wheel on said carrier meshing with one of said pinions on the layshaft, a plurality of rotary annular wheels, one meshing with said intermediate idle wheel and the others each meshing with one of the pinions on the layshaft, and means for selectively arresting and freeing said rotary annular wheels and rotary carrier for the purpose of effecting speed changes between the input and output shafts, and means for moving the output sunwheel axially into simultaneous engagement with a pinion on the layshaft and with said intermediate idle pinion for the purpose of locking the gear wheels and effecting a direct drive.

4. A change speed gear as specified in claim 2, having a driving clutch for the input shaft, means for engaging and disengaging said driving clutch, and means for locking and unlocking said input shaft to and from the rotary carrier when said driving clutch is disengaged and engaged, respectively.

5. A change speed gear as specified in claim 3, having a driving clutch for the input shaft, means for engaging and disengaging said driving clutch, and means for locking and unlocking said input shaft to and from the rotary carrier when said driving clutch is disengaged and engaged, respectively.

6. A change speed gear comprising an input shaft, an output shaft and a layshaft, a sunwheel fixed on the input shaft, a sunwheel fixed on the output shaft and a plurality of pinions fixed on the layshaft, each of said sunwheels meshing with one of said pinions on the layshaft, a rotary carrier in which said layshaft is journalled, an intermediate idle wheel on said carrier meshing with one of said pinions on the layshaft, a plurality of rotary annular wheels, one meshing with said intermediate idle wheel and the others each meshing with one of the pinions on the layshaft, and means for selectively arresting and freeing said rotary annular wheels and rotary carrier for the purpose of effecting speed changes between the input and output shafts, means for moving the output sunwheel axially into selective engagement with said intermediate idle wheel and said pinions on the layshaft, a driving clutch for the input shaft, means for locking said input shaft to said rotary carrier, mechanism for operating said driving clutch and said locking means, means operable by said driving clutch operating mechanism for releasing all of said rotary member arresting means when said driving clutch is disengaged, means for regulating the operative movement of the output sunwheel axial moving means, and selecting mechanism for setting the required rotary member arresting means for operation and also for setting said regulating means, and means operatively connected to the driving clutch operating mechanism for actuating said regulating means and said output sunwheel axial moving means when said driving clutch is re-engaged.

7. An epicyclic change speed gear having a plurality of rotary members, each having sets of ratchet teeth of opposite hand on their peripheries, a pair of pivoted pawls for engagement with the ratchet teeth of each rotary member, springs for moving said pawls into engagement with said ratchet teeth, a rotary cam member for disengaging said pawls against the action of said springs, and means for selectively setting said pawls for operation, comprising a disc for each pair of pawls, an extension on each pawl having a tooth for engagement with the periphery of its appropriate disc, said periphery having a slot for the reception of said tooth to permit of said pawl moving into an operative position, and mean for oscillating said discs and means for indicating the setting of said discs.

8. A change speed gear comprising an input shaft, an output shaft and a layshaft, a sunwheel fixed on said input shaft, a sunwheel fixed on said output shaft, a plurality of pinions fixed on said layshaft, said sunwheels each meshing with one of said pinions, a rotary carrier in which said lay shaft is journalled, an idle intermediate pinion journalled in said carrier and meshing with one of the pinions on the layshaft, a plurality of annular wheels, one meshing with said idle pinion and the others each meshing with one pinion on the layshaft, means for selectively arresting and freeing said carrier and said annular wheels, for the purpose of effecting speed changes, a propeller shaft connection, and means for selectively connecting said output shaft and said rotary carrier to said propeller shaft connection either singly or simultaneously, for the purposes of effecting, respectively, forward driving at various speeds, reverse driving and direct forward driving of said propeller connection.

9. A change speed gear as specified in claim 8, having a clutch between the input shaft and the rotary carrier, substantially as and for the purpose hereinbefore set forth.

10. A change speed gear comprising an input shaft, an output shaft and a layshaft, a sunwheel fixed on the input shaft, a sunwheel fixed on the output shaft and a plurality of pinions fixed on the layshaft, each of said sunwheels meshing with one of said pinions on the layshaft, a rotary carrier in which said layshaft is journalled, an intermediate idle wheel on said carrier meshing with one of said pinions on the layshaft, a plurality of rotary toothed wheels, one meshing with said intermediate idle wheel and the others each meshing with one of the pinions on the layshaft, and means for selectively arresting and freeing said rotary toothed wheels and rotary carrier for the purpose of effecting speed changes between the input and output shafts.

11. A change speed gear comprising an input shaft, an output shaft, and a layshaft, a sunwheel fixed on the input shaft, a sunwheel fixed on the output shaft and a plurality of pinions fixed on the layshaft, each of said sunwheels meshing with one of said pinions on the layshaft, a rotary carrier in which said layshaft is journalled, an intermediate idle wheel on said carrier meshing with one of said pinions on the layshaft, a plurality of rotary toothed wheels, one meshing with said intermediate idle wheel and the others each meshing with one of the pinions on the layshaft, and means for selectively arresting and freeing said rotary toothed wheels and rotary carrier for the purpose of effecting speed changes between the input and output shafts, and means for moving the output sunwheel axially from engagement with a pinion on the layshaft into driving connection with said intermediate idle pinion for the purpose of effecting a reversal in the rotation of the output shaft relatively to that of the input shaft.

12. A change speed gear comprising an input shaft, an output shaft and a layshaft, a sunwheel fixed on the input shaft, a sunwheel fixed on the output shaft and a plurality of pinions fixed on the layshaft, each of said sunwheels meshing with one of said pinions on the layshaft, a rotary carrier in which said layshaft is journalled, an intermediate idle wheel on said carrier meshing with one of said pinions on the layshaft, a plurality of rotary toothed wheels, one meshing with said intermediate idle wheel and the others each meshing with one of the pinions on the layshaft, and means for selectively arresting and freeing said rotary toothed wheels and rotary carrier for the purpose of effecting speed changes between the input and output shafts, and means for moving the output sunwheel axially into simultaneous driving connection with a pinion on the layshaft and with said intermediate idle pinion for the purpose of locking the gear wheels and effecting a direct drive.

13. A change speed gear comprising an input sunwheel, an output sunwheel and a layshaft, a rotary carrier in which said layshaft is journaled, pinions fixed on said layshaft, each of said sunwheels meshing with one of said pinions, an intermediate idle wheel on the rotary shaft meshing with one of the pinions on the layshaft, a plurality of rotary annular wheels, one meshing with said intermediate idle wheel and the others each meshing with one of the pinions on the layshaft, and means for selectively arresting and freeing said rotary annular wheels for effecting speed changes between the input and output sunwheels.

ALEC CHARLES CLAYTON.